US005729609A

United States Patent [19]
Moulart et al.

[11] Patent Number: 5,729,609
[45] Date of Patent: Mar. 17, 1998

[54] METHOD FOR PRODUCING A COMMON KEY IN TWO DEVICES, IN ORDER TO IMPLEMENT A COMMON CRYPTOGRAPHIC PROCEDURE, AND ASSOCIATED APPARATUS

[75] Inventors: Yves Moulart, Bruxelles; Michel Dawirs, Wezembeek, both of Belgium; Michel Hazard, Mareil Sur Mauldre, France

[73] Assignee: CP8 Transac, Paris, France

[21] Appl. No.: 592,350

[22] PCT Filed: May 9, 1995

[86] PCT No.: PCT/FR95/00607

§ 371 Date: Jan. 11, 1996

§ 102(e) Date: Jan. 11, 1996

[87] PCT Pub. No.: WO95/30976

PCT Pub. Date: Nov. 16, 1995

[30] Foreign Application Priority Data

May 10, 1994 [FR] France .................. 94 05883

[51] Int. Cl.[6] ........................................ H04L 9/08
[52] U.S. Cl. ........................ 380/21; 380/25; 380/44
[58] Field of Search ...................... 380/21, 23, 25, 380/28, 30, 44, 46

[56] References Cited

U.S. PATENT DOCUMENTS 5,204,901 4/1993 Hershey ......................... 380/21
5,602,915 2/1997 Campana et al. ............... 380/21

FOREIGN PATENT DOCUMENTS 0138320 4/1985 European Pat. Off. .
0613105 8/1994 European Pat. Off. .

OTHER PUBLICATIONS

Ramesh Karri 'IEEE INFOCOM'88. "The Conference on Computer Communications: Proceedings. A Security Imbedded Authentication Protocol" Mar. 1988, Institute of Electrical & Electronics Engineers, New Orleans, US XP 000093591 152169.

Primary Examiner—Salvatore Cangialosi
Attorney, Agent, or Firm—Edward J. Kondracki; Kerkam, Stowell, Kondracki & Clarke, P.C.

[57] ABSTRACT

The invention relates to a method and an apparatus for producing a key that is common to two devices that belong to different sets and are intended to implement a common cryptographic procedure. Each device is assigned a mother key (KC, KP) and a daughter key ($KP_{ck}$, $KC_{pi}$). The daughter key is developed on the basis of the mother key of the other device and of an identification datum specific to the device. When the procedure is performed, the two devices exchange their identification datum (ck, pi), which when processed with the aid of the mother key held by the device will yield the daughter key ($KC_{pi}$, $KP_{ck}$) of the other device. The pair of keys formed by the daughter key already held and by the daughter key that is calculated constitutes the common key.

16 Claims, 3 Drawing Sheets

METHOD FOR PRODUCING A COMMON KEY IN TWO DEVICES, IN ORDER TO IMPLEMENT A COMMON CRYPTOGRAPHIC PROCEDURE, AND ASSOCIATED APPARATUS

FIELD OF THE INVENTION

The invention relates to a method for producing a common key K assigned to an arbitrary device $CE_k$ of a set of first devices CE and to an arbitrary device $PME_i$ of a set second devices PME so that these two devices will implement a common cryptographic procedure.

DESCRIPTION OF RELATED ART

A conventional method consists of assigning all the first devices CE a common mother key, and all the second devices PME a different daughter key, obtained by diversification of the mother key by means of an identification datum of the second device in question.

A hierarchy is thus established between the first and second devices, since the level of security of the first devices is higher than that of the second devices.

During a session between a first device CE and a second device PME, the latter transmits its identification datum to the former, in such a way that the first device calculates the daughter key of the second device on the basis of its mother key; this daughter key constitutes the common key K.

This method is satisfactory in the event of attempted fraud at one of the second devices PME. The violation of the second device PME will allow the defrauder to discover only one daughter key at best, but not to learn the mother key, which would be the only one that could allow him to produce new, fraudulent daughter keys compatible with the mother key in order to fabricate fraudulent second devices PME.

However, if the defrauder violates one of the first devices CE, there is the risk that he can gain access to the mother key.

SUMMARY OF THE INVENTION

The problem the invention seeks to solve is to propose a method of the type defined at the outset above that offers good immunity to violation of an arbitrary one of the two devices PME and CE between which a common cryptographic procedure takes place.

To that end, the method of the invention includes the steps comprising assigning a first mother key KC to each of said first devices CE, and a second mother key KP to each of said second devices PME; assigning at least one daughter key $KP_{ck}$ to each first device $CE_k$, based on the second mother key KP relating to the second devices $PME_i$ and on an identification datum ck assigned to this first device $CE_k$; assigning at least one daughter key $KC_{pi}$ to each second device $PME_i$, based on the first mother key KC relating to the first devices $CE_k$ and on an identification datum pi assigned to the second device $PME_i$, each time a cryptographic procedure between a first device $PME_i$ and a second device $CE_k$ is requested; transmitting the identification datum pi, ck from each of these two devices to the other device; in each of these two devices, developing a daughter key $KP_{ck}$, $KC_{pi}$, based on the mother key KP, KC of the applicable device and on the identification datum ck, pi received from the other device; in each of these two devices, selecting the daughter key $KC_{pi}$, $KP_{ck}$ corresponding to the identification datum pi, ck received from the other device; and associating the two daughter keys constituted by the daughter key $KP_{ck}$; $KC_{pi}$ developed on the occasion of this procedure and the daughter key selected $KC_{pi}$; $KP_{ck}$ to form a pair constituting said common key K.

Thus, surprisingly, the most secret data, that is, the mother keys KC, KP, are distributed in the first and second devices, moreover regardless of the difference in hierarchical level that may exist between the two sets of devices and may be associated with the application in question (as an example, between a data base server and a terminal that provides access to it, or between an electronic cash register of a merchant and an electronic billfold of a customer). With respect to the nature of the keys held by the first and second devices, both devices have the same level of security.

Violating a first or second device $PME_i$ at best allows the defrauder to procure one of the mother keys, KP, but not the other, KC. To the extent that the daughter keys $KC_{pi}$ present in this device $PME_i$ are valid only for that particular device, he cannot use them to put them into new fraudulent devices; on the contrary, he would have to be capable of recreating, for each fraudulent device, the indispensable daughter keys $KC_{pi}$ that are compatible with the identification datum pi of that device.

The invention also relates to the apparatus associated with this procedure.

BRIEF DESCRIPTION OF THE DRAWINGS

Further details and advantages of the invention will become apparent in the ensuing description of a preferred, but not limiting, embodiment, taken in conjunction with the accompanying drawings, in which.

DESCRIPTION OF THE PREFERRED EMBODIMENTS

The exemplary embodiment shown takes into consideration two types of devices, the first being an electronic cash register CE disposed in a merchant's point of sale terminal, and the second device PME being an electronic billfold, constituted by a portable object in the form of a card of the bank card type, and assigned to a potential customer. Each cash register, like each billfold, includes information processing means, for example in the form of an associated microprocessor, associated on the same chip with a self-programmable nonvolatile memory, such as that defined by French Patent No. 2461301 and its U.S. equivalent U.S. Pat. No. 4,382,279.

Figure 1:
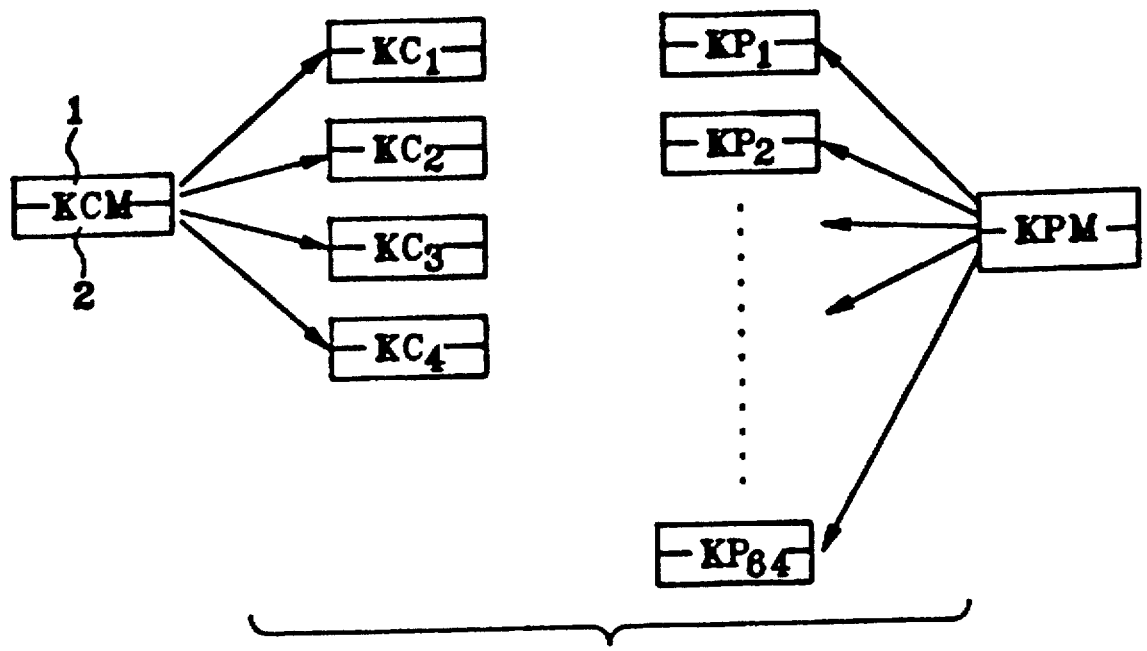
FIG. 1 shows two master keys KCM and KPM, and their breakdown into a plurality of mother keys.

As shown in FIG. 1, two master keys KCM and KPM are defined, which are at the highest security level in the hierarchy of the various keys used. Advantageously, each master key is double, or in other words is constituted of two words 1,2 (each of 64 bits, for example), and gives rise to a plurality of mother keys which are also double. Thus the master key KCM gives rise to four mother keys $KC_1$–$KC_4$ relating to the cash registers C, while the master key KCP gives rise to 64 mother keys $KP_1$–$KP_{64}$ relating to the billfold P.

Figure 4:
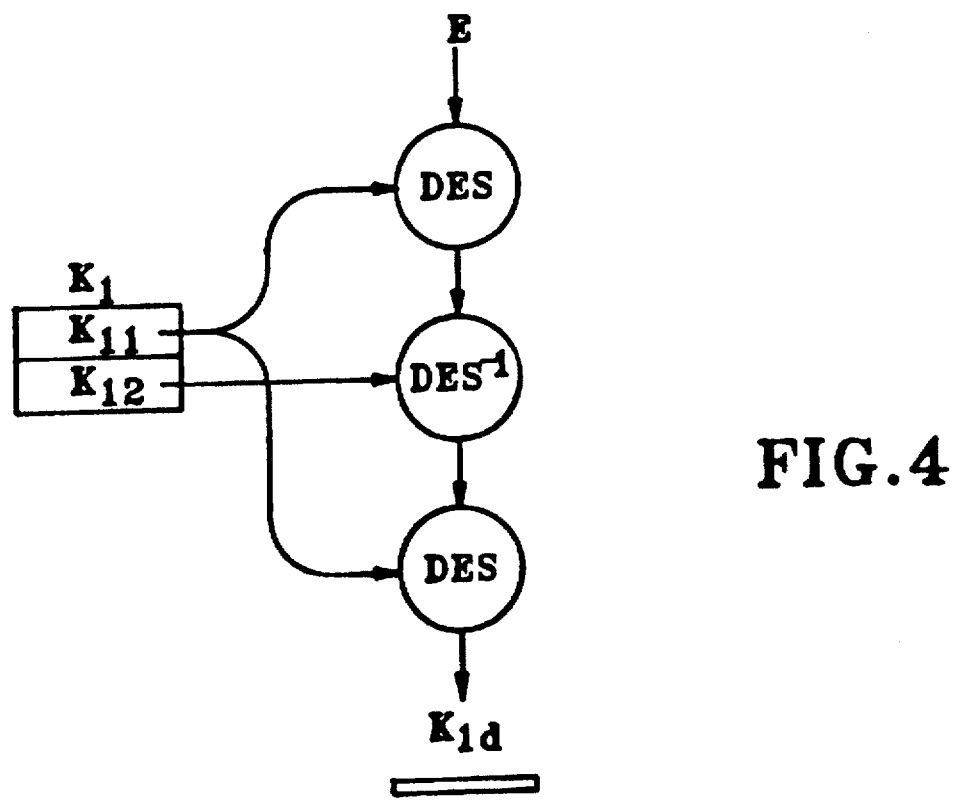
FIG. 4 shows one way of producing a diversified key $K_{1d}$ based on a base key $K_1$ and a diversification datum E.

One advantageous diversification principle, among others, is shown in FIG. 4. It is based on the use of what is known as the "triple DES" algorithm (for Data Encryption Standard), in which a diversification datum E constitutes the input variable of a first algorithm DES, and the result of calculation constitutes the input variable of a second algorithm $DES^{-1}$, which is the inverse of the first, and the second result of calculation constitutes the input variable of a third algorithm DES that is identical to the first. The algorithm DES causes a key $K_{11}$ to act, while the algorithm $DES^{-1}$ causes a key $K_{12}$ to act. Advantageously, $K_{11}$ and $K_{12}$ constitute the two single keys of one double key $K_1$. They are made up, for example, of one 64-bit word. The result of the "triple DES" algorithm is a key $K_{1d}$ that is diversified compared with the key $K_1$: a different diversified key $K_{1d}$ corresponds to each different value of E. The key $K_{1d}$ is of the same size as the keys $K_{11}$ and $K_{12}$.

The four mother keys $KC_1$ to $KC_4$ are obtained, for example, by the method of FIG. 4, using the ordinal number 1–4 of these keys as the diversification datum E and using the master key KCM as the key $K_1$. To produce double keys, the diversified key $K_{1d}$ constituting the result of calculation is used as a diversification datum for a second calculation, which yields a second diversified key K2d; the pair of keys $K_{1d}$, K2d thus produces forms the double key sought. The sixty-four mother keys $KP_1$–$KP_{64}$ are produced in the same way.

The mother keys $KC_1$–$KC_4$ define four groups of cash registers, and all the cash registers of a given population of cash registers, for instance including 100,000 cash registers, are distributed among these four groups. As will be more apparent hereinafter, the number of groups has been chosen to be low, because it directly affects the bulk of the memory zone of each billfold assigned to store the daughter keys. Classifying the various cash registers in the various groups can be done as follows: The binary numbers 00, 01, 10 and 11 are assigned to the four groups, and all the cash registers in which the two least significant bits of their serial number are 00 are assigned to the group 00, and so forth for the other cash registers.

In a similar way, the 64 mother keys $KP_1$–$KP_{64}$ define 64 families of billfold; ten million billfolds, for example, comprise the billfold population and are distributed among the various families. The distribution is done using the six least significant bits of the serial number of each billfold.

Figure 3:
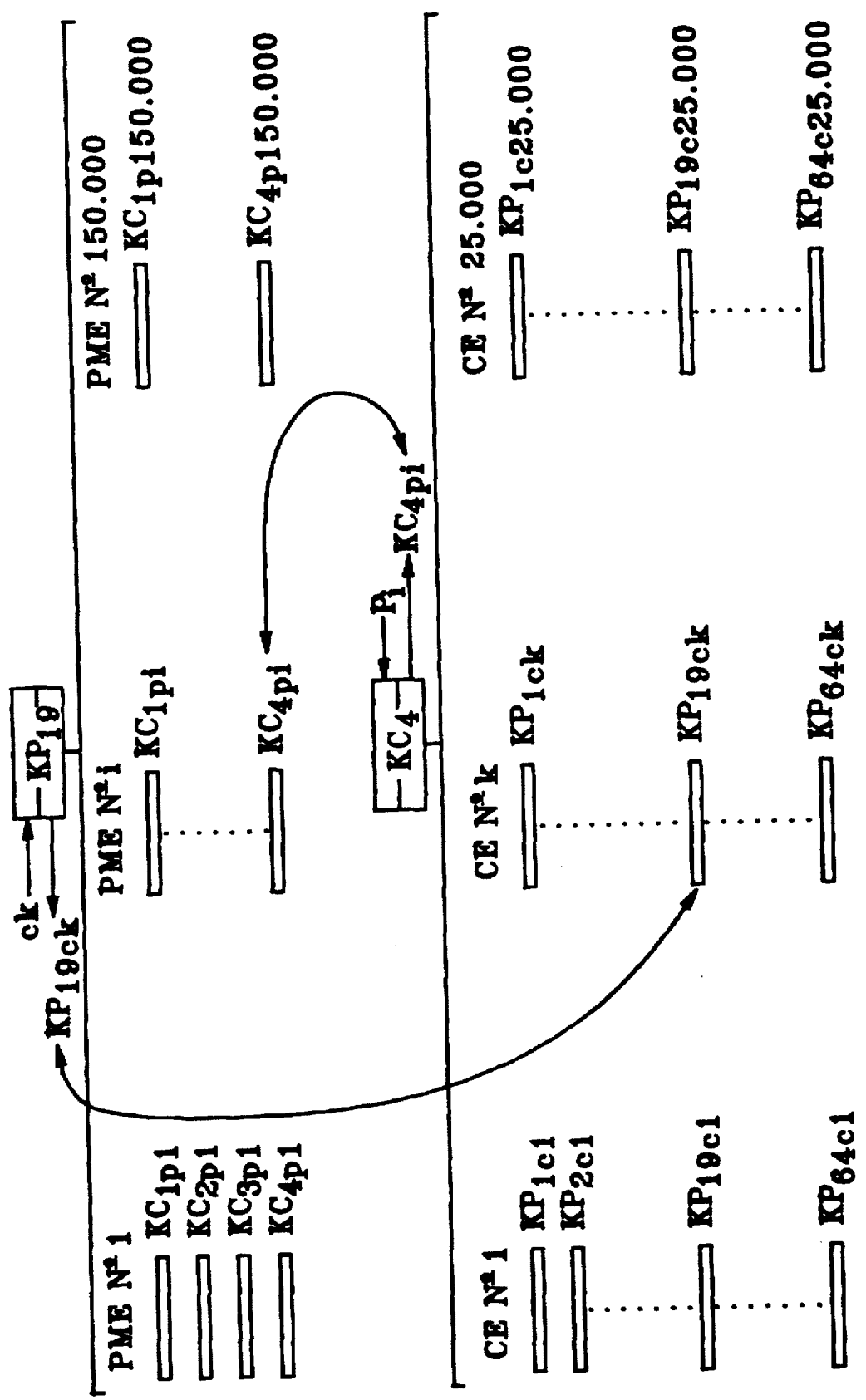
FIG. 3 shows a billfold family, No. 19, in which each billfold has one common mother key $KP_{19}$ and a plurality of daughter keys $KC_{ipj}$, and a group, No. 4, of electronic cash registers, each of which has one common mother key $KC_4$ and a plurality of daughter keys $KP_{icj}$.

Such a classification is shown in FIG. 3, where the group No. 4 of cash registers defined by the mother key $KC_4$ contains one-fourth of the cash registers, that is, 25,000 cash registers, here numbered from 1 to 25,000, for the sake of simplicity. In the same way, the billfold group No. 19 defined by the mother key $KP_{19}$ contains a fraction corresponding to 1/64 of all the billfolds, or approximately one hundred fifty thousand billfolds, numbered here from 1 to 150,000, for the sake of simplicity.

Figure 2:
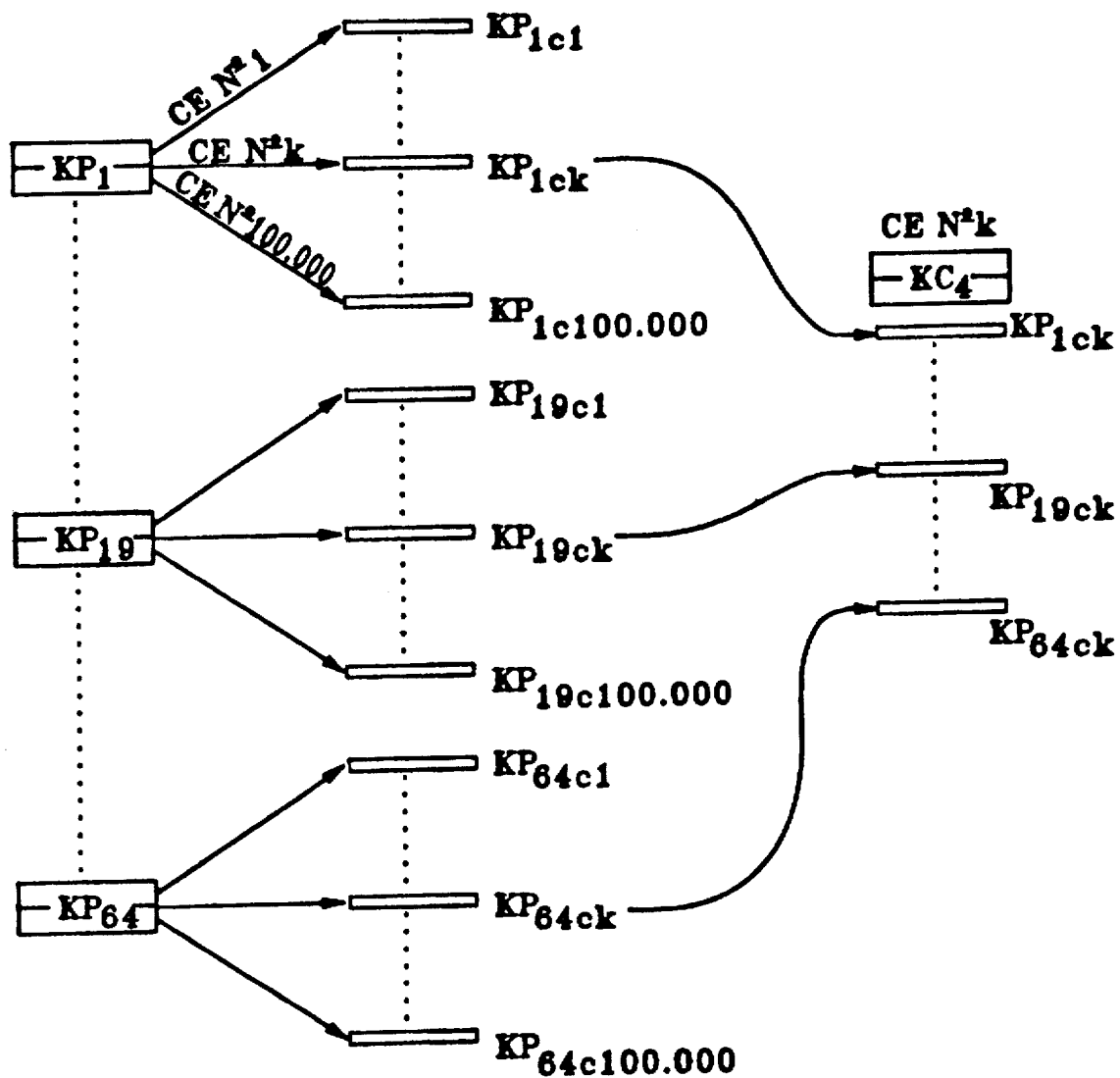
FIG. 2 shows how each mother key $KP_i$ is in turn broken down into a plurality of daughter keys $KP_{i,j}$, and how one assigns a plurality of these daughter keys to an electronic cash register $KC_4$.

The way in which the daughter keys are produced from the mother keys will be described with reference to FIG. 2. For example, the mother key $KP_1$ is diversified into one hundred thousand daughter keys $KP_{1c1}$ to $KP_{1c100,000}$, using the entire serial number of the various cash registers as the diversification datum E; conventionally, such a serial number occupies from four to five 8-bit bytes. The mother keys KP2–KP64 are diversified in the same way, on the basis of the serial numbers of the cash registers. For the diversification, the method of FIG. 4 based on the "triple DES" algorithm is advantageously used, in which the keys $K_{11}$ and $K_{12}$ respectively correspond to the two single keys that constitute each mother key $KP_i$.

The diversification of the mother keys $KC_{1-KC4}$ is done in comparable fashion, based on the serial numbers of the various billfolds, to produce daughter keys $KC_{1p1}$–$KC_{1p10,000,000}$ through $KC_{4p1}$–$KC_{4p10,000,000}$.

How each cash register and each billfold is personalized by assigning it a unique set of keys will now be described. Cash register No. k, which for example belongs to the group of cash registers No. 4 (FIG. 3), initially includes one mother key $KC_4$, which is the mother key of the group. Next, it includes 64 daughter keys, $KP_{1ck}$–$KP_{64ck}$. This set of daughter keys has been constituted as shown in FIG. 2: In each of the 64 sets of daughter keys originating from the 64 mother keys $KP_1$–$KP_{64}$ relating to the billfold families, uniquely the daughter key with the subscript ck is selected. In all, cash register No. k thus possesses a set of 65 keys, one of which is the double mother key and the others of which are the single daughter keys. FIG. 3 also shows the contents of the sets of keys for cash registers numbered 1–25,000 of the same group.

This process is continued in a similar manner to make up the set of keys of each billfold. For example, billfold No. i includes the mother key $KP_{19}$ and the four daughter keys $KC_{1pi}$–$KC_{4pi}$.

By comparing the contents of the set of keys of a billfold No. i and a cash register No. k, one observes first of all that each contains only a single mother key, $KP_{19}$ and $KC_4$, respectively, which indeed relates to the type of device in question, that is, a billfold P and a cash register C. Hence one will not find in the same set of keys both a mother key $KP_i$ and a mother key $KC_k$, or in other words, keys that derive directly from the master key KPM and keys that derive directly from the master key KCM.

On the other hand, each set of keys of a first type of device contains daughter keys that all originate in the same mother key of the second type of device, with the mother key being different for each daughter key: thus billfold No. i contains four daughter keys $KC_{1pi}$–$KC_{4pi}$ that come from the mother keys $KC_1$–$KC_4$ relating to the cash registers, and in the same way, cash register No. k contains 64 daughter keys $KP_{1ck}$–$KP_{64ck}$.

The use of these different keys will now be described, in connection with the particular application of an electronic billfold. In such an application, the handling of a transaction consists of debiting a certain amount from the billfold and crediting the same amount to the cash register of the merchant involved. For security reasons, it is stipulated that the credit to the cash register cannot be made until after debiting of the billfold, so as to prevent an illicit creation of electronic money to the detriment of the organization that issued the billfold.

To that end, each billfold is arranged so as to generate a debit certificate upon each transaction with a given cash register; the certificate is the signature S of a message M, which is made up of information relating to the transaction in question (identification of the customer, date, amount, etc.). The signature of the message is the result of a calculation performed by a predetermined algorithm F, using the message and a key K as its input data. As for the cash register, it verifies the authenticity of the signature S transmitted by the billfold. If the algorithm F is of the symmetrical type, then this verification will require the same key K.

If the signature is confirmed, then the cash register can record the credit corresponding to the transaction.

In a highly advantageous way, the key K is calculated from two daughter keys, one of which, $KC_{4pi}$, being derived from the same mother key $KC_4$ of the cash register No. k involved and diversified with the number of the billfold involved, and the other, $KP_{19ck}$, being derived symmetrically from the mother key $KP_{19}$ of billfold No. i and diversified with the number k of the cash register. For example, with reference to FIG. 4, the two daughter keys $KC_{4pi}$ and $KP_{19ck}$ make up the two keys $K_{11}$ and $K_{12}$, and a random number, which is a function of the pair (cash register and billfold) and is always different from one session to another, makes up the diversification datum E; hence a single session key Ks is then constituted by the result $K_{1d}$ of the calculation. This calculation is done simultaneously in the cash register and in the billfold. If one wishes to obtain a double session key, then one may for example re-do the calculation of FIG. 4, this time using the single session key Ks already calculated as the diversification datum E.

The way in which the daughter keys $KC_{4pi}$ and $KP_{19ck}$ are made available in the cash register No. k and in the billfold No. i will now be described. On the occasion of a transaction, the cash register No. k and the billfold No. i identify themselves to each other by exchanging their respective serial numbers pi, ck. Then, using its mother key $KP_{19}$ and its serial number ck, the billfold calculates a daughter key $KP_{19ck}$, by the procedure described above (see the corresponding arrows in FIG. 3). In the same way, using its mother key $KC_4$ and the serial number pi, the cash register calculates a daughter key $KC_{4pi}$. In addition, the billfold No. i, from the two least significant bits of the serial number ck of the cash register, calculates the group number 4 to which the cash register belongs and looks in its memory for the daughter key $KC_{4pi}$ relating to that group. Cash register No. k proceeds in the same way to select its daughter key $KP_{19ck}$. The billfold and the cash register then calculate the session key Ks, each from the common pair $KP_{19ck}$, $KC_{4pi}$.

If a defrauder should gain possession of a billfold No. i and attempt to extract the set of keys from it, he would have at his disposal the mother key $KP_{19}$, which would allow him to generate the daughter key $KP_{19ck}$, regardless of which cash register No. k he seeks access to.

However, he could not re-use the set of daughter keys $KC_{1pi}$–$KC_{4pi}$ to insert it into a batch of fraudulent billfolds; these keys are in fact specific to the billfold No. i. He would have to be capable of creating new daughter keys $KC_{1pj}$–$KC_{4pj}$ that are adapted to new billfold identification numbers pj; to do so, he would have to violate the various cash registers in order to extract the mother keys $KC_1$–$KC_4$ from them.

In a less advantageous embodiment of the invention, only a single family of billfold and/or a single group of cash registers is defined. In that case, each billfold and/or cash register contains the unique mother key of the family or group and a single daughter key derived form the other mother key.

In another variant of the invention, a single master key is used to generate all the mother keys of the billfold and the cash registers. In this case, one is assured that the mother keys are indeed different for the billfold and the cash registers. For example, one could use the six least significant bits of the serial numbers of the billfold to generate their mother keys, and the two least significant bits of the serial numbers of the cash register to generate their mother keys, with the bits selected having the same rank in the diversification datum E.

In another variant of the invention, no session key Ks is calculated from the two daughter keys $KC_{4pi}$ and $KP_{19ck}$ selected by the billfold and the cash register; instead, this pair of daughter keys is used directly for the common cryptographic procedure.

In another variant of the invention, the identification datum of an arbitrary device (billfold or cash register) is constituted by the ordinal number of the family or group to which it belongs, rather than by a number specific to that device.

The invention is applicable to all the levels in the hierarchy of any system for furnishing goods or services, for access to data bases, or for a private or public exchange of data; the invention will serve equally well to manage either the dialogue between the supreme authority of the system and all the devices that cooperate directly with it, or the dialogue between two sets of devices on an intermediate level, or at the lowest level with the final interlocutor.

The invention is applicable to any procedure that requires two devices that have a dialogue with one another to hold a common key, for instance by encryption to protect the transmission of sensitive data, to generate a transaction certificate or a message signature, and so forth.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

We claim:

1. A method for producing a common key (K) assigned to an arbitrary device ($CE_k$) of a set of first devices (CE) and to an arbitrary device ($PME_i$) of a set of second devices (PME) so that these two devices will implement a common cryptographic procedure, characterized in that it includes the steps comprising:

assigning a first mother key (KC) to each of said first devices (CE), and a second mother key (KP) to each of said second devices (PME);

assigning at least one daughter key ($KP_{ck}$) to each first device ($CE_k$), based on the second mother key (KP) relating to the second devices ($PME_i$) and on an identification datum (ck) assigned to this first device ($CE_k$);

assigning at least one daughter key ($KC_{pi}$) to each second device ($PME_i$), based on the first mother key (KC) relating to the first devices ($CE_k$) and on an identification datum (pi) assigned to the second device ($PME_i$), and each time a cryptographic procedure between a first device ($PME_i$) and a second device ($CE_k$) is requested;

transmitting the identification datum (pi, ck) from each of these two devices to the other device;

in each of these two devices, developing a daughter key ($KP_{ck}$, $KC_{pi}$), based on the mother key (KP, KC) of the applicable device and on the identification datum (ck, pi) received from the other device;

in each of these two devices, selecting the daughter key ($KC_{pi}$, $KP_{ck}$) corresponding to the identification datum (pi, ck) received from the other device; and associating the two daughter keys constituted by the daughter key ($KP_{ck}$; $KC_{pi}$) developed on the occasion of this procedure and the daughter key selected ($KC_{pi}$; $KP_{ck}$) to form a pair constituting said common key (K).

2. The method of claim 1, further comprising:

defining a plurality of groups (1–4) of first devices (CE) and a plurality of families (1–64) of second devices (PME);

assigning each group or family a different mother key ($KC_g$; $KP_f$), each device of the group or family having the mother key of the group or family as its mother key;

defining a plurality of daughter keys ($KP_{gck}$) in each first device ($CE_k$), based on the mother keys ($KP_f$) relating to the second devices and on its identification key (ck);

defining a plurality of daughter keys ($KC_{gpi}$) in each second device ($PME_i$), based on the mother keys ($KC_g$) relating to the first devices and on its identification key (pi);

in the first and second devices and among the set of daughter keys held ($KP_{fck}$; $KC_{gpi}$), selecting the one ($KP_{19ck}$; $KC_{4pi}$) whose mother key ($KP_{19}$, $KC_4$) corresponds to the mother key held by the other device.

3. The method of claim 1, further comprising assigning a different identification datum to each device of a set of devices.

4. The method of claim 1, further comprising developing the first ($KC_g$) and second ($KP_f$) mother keys based on two respective different master keys (KCM, KPM).

5. The method of claim 1, further comprising using an algorithm, for developing the aforementioned different keys, that implements two keys ($K_{11}$, $K_{12}$) that as applicable comprise a master key or a duplicate mother key, or said common pair of daughter keys.

6. An apparatus for managing transactions or furnishing services and including a set of first devices (CE) and a set of second devices (PME), an arbitrary first device being arranged to exchange transactions or services with an arbitrary second device by implementing a common cryptographic procedure by means of a session key ($K_s$) common to these two devices, characterized in that each of said devices (CE, PME) includes a memory in which a first mother key (KC) is recorded as regards the first devices (CE) and a second mother key (KP) is recorded as regards the second devices (PME);

the memory of each first device ($CE_k$) also contains at least one daughter key ($KP_{ck}$) defined on the basis of the second mother key (KP) relating to the second devices ($PME_i$) and of an identification datum (ck) assigned to this first device ($CE_k$);

the memory of each second device ($PME_i$) also contains at least one daughter key ($KC_{pi}$) defined on the basis of the first mother key (KC) relating to the first devices ($CE_k$) and of an identification datum (pi) assigned to this second device ($PME_i$);

each device ($CE_k$, $PME_i$) includes means for exchanging its identification datum (pi, ck) with an arbitrary device with which a common cryptographic procedure is to be implemented, and processing means for developing a daughter key ($KP_{ck}$, $KC_{pi}$) on the basis of its mother key (KP, KC) and of the identification datum received from the other device, to select from within its memory the daughter key ($KP_{ck}$) corresponding to the identification datum (pi, ck) received from the other device, and to associate the two daughter keys constituted by ($KP_{ck}$; $KC_{pi}$) developed on the occasion of this procedure and the daughter key selected ($KP_{ck}$; $KC_{pi}$) to form a pair constituting said common key (K).

7. The apparatus of claim 6, wherein each first device (CE) is an electronic cash register disposed in a point of sale terminal, and each second device (PME) is an electronic billfold constituted by a portable object and assigned to a potential customer, the billfold being arranged to calculate a debit certificate on the basis of data characterizing the transaction or service in question and by means of a predetermined algorithm that as its key uses said common key (K), this certificate being transmitted to the electronic cash register, which verifies the authenticity of the certificate by means of a predetermined algorithm that as its key uses said common key (K).

8. The method of claim 2, further comprising assigning a different identification datum to each device of a set of devices.

9. The method of claim 2, further comprising developing the first ($KC_g$) and second ($KP_f$) mother keys based on two respective different master keys (KCM, KPM).

10. The method of claim 3, further comprising developing the first ($KC_g$) and second ($KP_f$) mother keys based on two respective different master keys (KCM, KPM).

11. The method of claim 2, further comprising using an algorithm, for developing the aforementioned different keys, that implements two keys ($K_{11}$, $K_{12}$) that as applicable comprise a master key or a duplicate mother key, or said common pair of daughter keys.

12. The method of claim 3, further comprising using an algorithm, for developing the aforementioned different keys, that implements two keys ($K_{11}$, $K_{12}$) that as applicable comprise a master key or a duplicate mother key, or said common pair of daughter keys.

13. The method of claim 4, further comprising using an algorithm, for developing the aforementioned different keys, that implements two keys ($K_{11}$, $K_{12}$) that as applicable comprise a master key or a duplicate mother key, or said common pair of daughter keys.

14. The method of claim 8, further comprising using an algorithm, for developing the aforementioned different keys, that implements two keys ($K_{11}$, $K_{12}$) that as applicable comprise a master key or a duplicate mother key, or said common pair of daughter keys.

15. The method of claim 9, further comprising using an algorithm, for developing the aforementioned different keys, that implements two keys ($K_{11}$, $K_{12}$) that as applicable comprise a master key or a duplicate mother key, or said common pair of daughter keys.

16. The method of claim 10, further comprising using an algorithm, for developing the aforementioned different keys, that implements two keys ($K_{11}$, $K_{12}$) that as applicable comprise a master key or a duplicate mother key, or said common pair of daughter keys.

* * * * *